June 7, 1955  F. L. ROUTH  2,709,867
AUTOMATIC FISHING REELS
Filed April 10 1950

INVENTOR.
FELIX L. ROUTH
BY
A. Yates Dowell
ATTORNEY

United States Patent Office 2,709,867
Patented June 7, 1955

2,709,867

AUTOMATIC FISHING REELS

Felix L. Routh, St. Petersburg, Fla., assignor of twenty-five per cent to Charles C. Rice and twenty-five per cent to Walter A. Bowers, both of St. Petersburg, Fla.

Application April 10, 1950, Serial No. 154,973

6 Claims. (Cl. 43—15)

This invention relates to commercial fishing and more particularly to an automatic fishing reel for reeling in fishing line after a strike. Numerous and sundry devices of this general character have been employed, however these devices have not been completely satisfactory because they have failed to operate efficiently and satisfactorily, they have been too costly and complicated, and they have lacked the necessary durability as well as having been unsatisfactory for other reasons.

It is an object of the invention to provide a simple and inexpensive device in the nature of a reel for a fishing line having mechanism for causing the line with a catch to be reeled in automatically after a strike.

Another object of the invention is to provide control mechanism which will close a circuit and cause an electric motor to be energized to rotate a reel to reel in a fishing line upon a predetermined pull upon such line.

A further object of the invention is to provide mechanism of the character just described susceptible of delicate adjustment so that it may be set to operate at any desired amount of pull and which will operate with a sudden movement to cause decisive operation of a control switch.

A still further object is to provide a device of the character described in which the circuit to the motor will be broken and the parts restored to their initial position when the line has been reeled in a predetermined amount thereby permitting the catch to be removed from the line and damage to the line or the mechanism avoided.

Further objects and advantages of the invention will be apparent from the following description taken in conjunction with the drawings, wherein.

Figure 1:
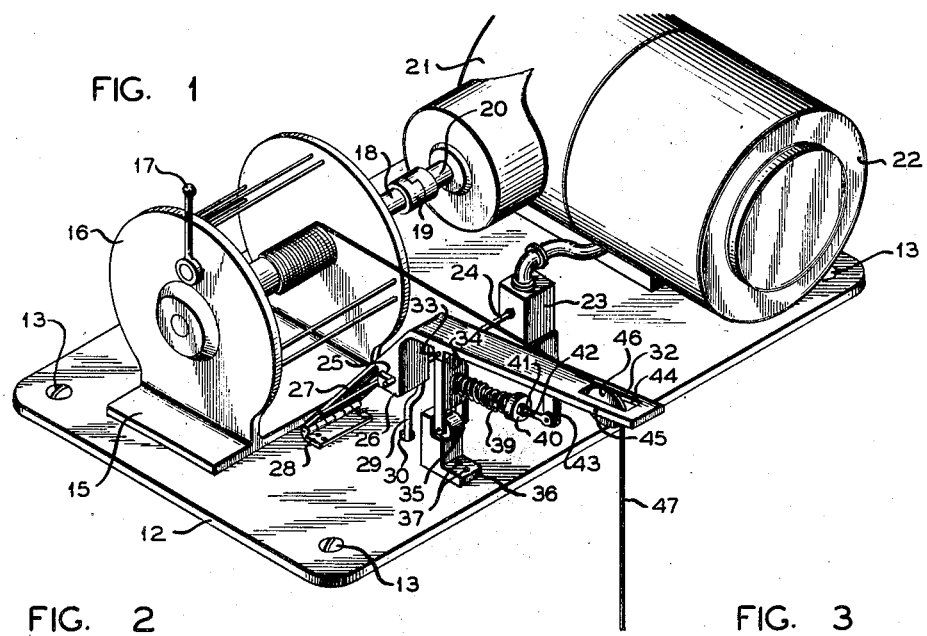
Fig. 1 is a perspective view illustrating one application of the invention.
Figures 2, 3:
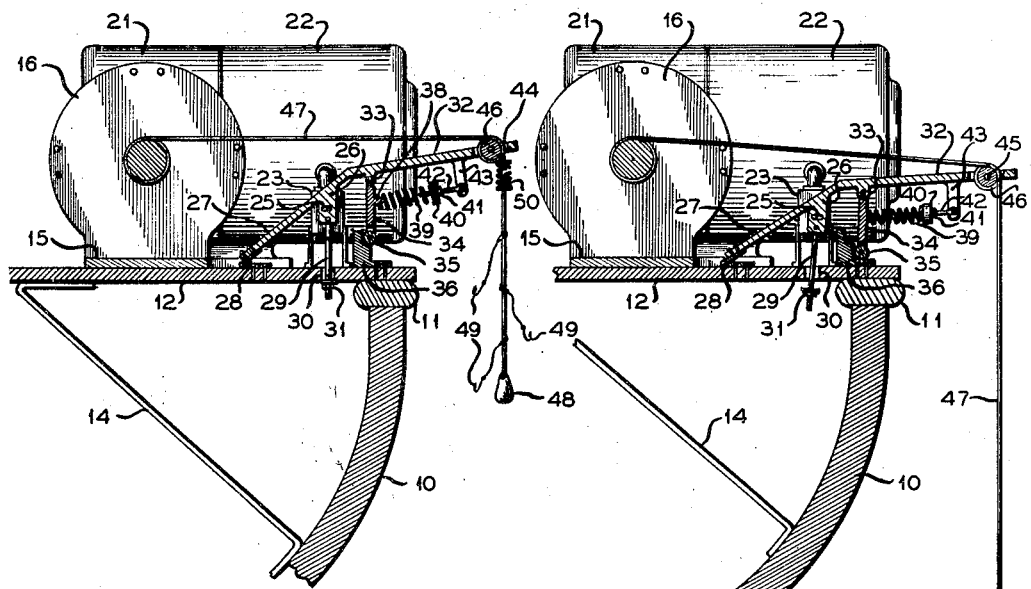
Figs. 2 and 3 are views in transverse section with the parts in two different positions.
Figure 4:
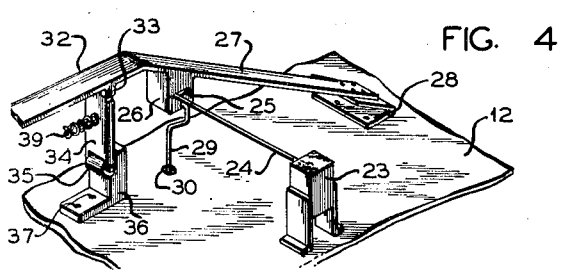
Fig. 4 a fragmentary detail.

Briefly stated, the invention comprises an automatic reel having an electric motor for driving the same upon being energized through an electric switch controlled by an arm actuated by the pull on the line. When the line is pulled the control arm will move downwardly in contact with the switch operating arm closing the switch and energizing the motor so that the line will be retracted or reeled in and when the line has been retracted the desired amount the arm will be raised with the switch actuating arm and the electric circuit to the motor broken so that the winding of the reel will be stopped.

With continued reference to the drawing, a commercial or other fishing vessel having a hull 10 and a gunwale 11 may receive thereon a platform 12 fastened to the gunwale by bolts 13 and supported by one or more brackets 14.

On the platform 12 is mounted the base 15 of a reel 16 having a lever 17 mounted thereon to permit free rotation of the reel spool. The reel is provided with a shaft 18 connected by a coupling 19 with the shaft 20 of a reduced gear box 21 containing conventional reduction gearing, not shown, through which the reel is driven by a motor 22. This motor is controlled by a toggle switch 23 from which extends a manipulating lever 24, upon the operation of which the motor is energized.

The free end of the manipulating lever 24 extends into a slot 25 of a depending boss 26 carried by an actuating member or arm 27 mounted by a hinge 28 on the platform 12. Upon the downward and upward swinging movement of the arm 27 the manipulating lever will be actuated to make and break the circuit to the motor 22 for rewinding the reel.

Adjustable stop means is provided for limiting the upward swinging of the arm 27; such stop means includes a link 29 having its upper end journalled in the depending boss 26 and having its lower threaded end extending through an opening 30 in the platform 12 and carrying beneath the platform a nut 31. By rotating this nut the effective length of the link and the upward swinging of the arm can be controlled.

The arm 27 is provided with an extension 32 having a depending lug 33 to which is pivoted a depending leg or prop 34. At the lower end of this prop or leg is mounted an anti-friction roller 35 for engagement with a terrace cam or rest 36 having one or more stepped surfaces. The cam 36 is attached by fasteners 37 to the platform 12 and the anti-friction roller 35 with its prop is adapted to roll off a terrace or shelf of the cam downwardly so that the arm 27 will drop downwardly and actuate the manipulating lever 24 of the toggle switch 23.

The leg or prop 34 is provided with a knob or boss 38 which fits into the end of a coiled spring 39 and on the opposite end of the spring is a cap or shield 40. This cap is engaged by a nut 41, on a threaded arm 42, pivoted to a depending bracket 43 on the underside of the extension 32 of the arm 27. Near its outer end, the arm extension 32 is provided with an opening 44 across which is mounted a pin 45 carrying a pulley 46 over which extends a fishing line 47 from the reel 16. The line is provided with a conventional weight or sinker 48 and a series of fish hooks 49 so that upon release of the reel by the free spooling lever 17 the weight or sinker 48 will cause the line to be unwound from the reel and thus remain until a pull upon the same tends to straighten the line to the shortest distance between two points, namely between the weight or sinker 48 and the reel. This will exert a pressure through the pulley 46 on the end of the arm or lever extension 32 causing the roller 35 on the end of the prop 34 to roll off the ledge or terrace of the cam against the action of the spring 39. The amount of force or pull is sufficient to overcome the tension on the spring 39. When the roller 35 moves off its supporting ledge carrying with it the prop 34 the arm 27 will drop down and through the boss 26, move the manipulating lever 24 and actuate the toggle switch 23 to energize the motor and cause rewinding of the line 47 on the reel 16.

In order to limit the reeling in of the line or to prevent loss of the catch to the mechanism as well as possible loss of the catch, the line is provided with a stop 50 too large to pass through the opening 44 and over the pulley 46 and consequently the pull of the reel will cause such stop to engage and raise the extension 32 of the arm 27 thereby moving the manipulating lever 24 of the toggle switch 23 to interrupt the circuit to the motor which rotates the reel. The reel with the free spooling lever 17 has a conventional override clutch (not shown) for holding the reel and line in position when the motor is deenergized so that upon release of such clutch the line can be released or played out for another catch.

It will be readily understood from the foregoing that an automatic reel is provided by means of which the line only need be initially released and the free spooling lever set when fishing is first begun as well as after a catch, and that any desired number of such reels may be under the control of a single individual.

It will be obvious to those skilled in the art that various changes may be made in the invention without departing from the spirit and scope thereof and therefore this invention is not limited by that which is shown in the drawing or described in the specification but only as indicated in the appended claims.

What is claimed is:

1. In an automatic fishing reel, a rotatable reel member, a motor geared to drive said reel member, a switch for controlling the operation of said motor, a line attached to said reel member, control means for said switch actuatable by said line for energizing said motor upon a pull upon said line and for deenergizing said motor upon the reeling in of said line a predetermined amount, said control means including an actuating member, a prop for said actuating member, a rest for supporting said prop in an elevated position but permitting the same to move off said rest upon the exertion of pressure on said prop, variable force applying means for resisting movement of said prop from said rest, means for returning said prop to its initial position upon the reeling in of said line a predetermined amount, and a limit stop for said actuating member.

2. In an automatic fishing reel, a rotatable reel member, a motor geared to drive said reel member, switch means for controlling the operation of said motor, means operable by a fishing line for actuating said switch means for energizing said motor upon a pull on said line and for deenergizing said motor upon the reeling in of said line a predetermined amount, said switch means including an actuating member, a prop for said actuating member, a rest for supporting said prop in an elevated position but permitting the same to move off said rest upon the exertion of pressure on said prop, variable force applying means for resisting movement of said prop from said rest, and means for returning said actuating member to its initial position upon the reeling in of said line a predetermined amount.

3. In an automatic fishing reel, a rotatable reel member, a motor geared to drive said reel member, switch means for controlling the operation of said motor, means operable by a fishing line for actuating said switch means for energizing said motor upon a pull on said line and for deenergizing said motor upon the reeling in of said line a predetermined amount, said switch means including an actuating member, a prop for said actuating member, a rest for supporting said prop in an elevated position but permitting the same to ride off said rest upon the exertion of pressure on said prop, and variable force applying means for resisting the movement of said prop from said rest.

4. In an automatic fishing reel, a rotatable reel member, a motor geared to drive said reel member, interrupter means for controlling the operation of said motor, means operable by a fishing line for actuating said interrupter means for energizing said motor upon a pull on said line and for deenergizing said motor upon the reeling in of said line a predetermined amount, said interrupter means including an actuating member, a prop for said actuating member, and a rest for supporting said prop in an elevated position but permitting the same to move off said rest upon the exertion of pressure on said prop.

5. A device for automatically reeling in a line comprising a reel, a line attached to said reel, a motor drivingly connected to said reel for winding said line thereon, control means for said motor for causing the winding of said line on said reel, a first means operatively connected to said control means including a member movable across the path of the line and maintaining the line out of a straight line from said reel, a second means for releasably maintaining said first means in position to render the control means inoperative, said second means being actuated by a strain on the line whereby said second means permits said first means to be displaced, third means operatively connecting said first means to the motor control means whereby the motor is energized when said first means is displaced, and fourth means on said line for producing a restoring force on said first means upon the winding of a predetermined length of line on said reel and said second means automatically being restored to its position for maintaining said first means in position to render said control means inoperative.

6. A device for automatically reeling in a line comprising a reel, a line attached to said reel, a motor drivingly connected to said reel for winding said line thereon, control means for said motor for causing the winding of said line on said reel, a first means operatively connected to said control means including a member movable across the path of the line and maintaining the line out of a straight line from said reel, a second means for releasably maintaining said first means in position to render the control means inoperative, said second means being actuated by a strain on the line whereby said second means permits said first means to be displaced, third means operatively connecting said first means to the motor control means whereby the motor is energized when said first means is displaced, and fourth means for producing a restoring force on said first means upon the winding of a predetermined length of line on said reel whereby said second means is automatically restored to its position for maintaining said first means in position to render said control means inoperative.

References Cited in the file of this patent

UNITED STATES PATENTS

| 1,360,429 | Michaelis | Nov. 30, 1920 |
| 2,523,592 | Powell et al. | Sept. 26, 1950 |
| 2,541,876 | Lockwood | Feb. 13, 1951 |

FOREIGN PATENTS

| 62,781 | Germany | June 10, 1892 |